United States Patent [19]

Mulgrave

[11] Patent Number: 5,783,890
[45] Date of Patent: Jul. 21, 1998

[54] IMPRINTED GEOMETRIC MAGNETIC ANTICOG PERMANENT MAGNET MOTOR

[75] Inventor: Robert L. Mulgrave, Sanddown, N.J.

[73] Assignee: Cleveland Motion Controls, Inc., Cleveland, Ohio

[21] Appl. No.: 494,404

[22] Filed: Jun. 26, 1995

[51] Int. Cl.[6] .................................................. H02K 23/42
[52] U.S. Cl. ........................... 310/156; 310/152; 310/154; 310/254; 310/261
[58] Field of Search .................................. 310/156, 261, 310/254, 154, 152

[56] References Cited

U.S. PATENT DOCUMENTS

| | | | |
|---|---|---|---|
| 3,860,843 | 1/1975 | Kawasaki et al. | 310/67 R |
| 4,091,300 | 5/1978 | Lynch et al. | 310/154 |
| 4,216,400 | 8/1980 | Lynch et al. | 310/154 |
| 4,341,969 | 7/1982 | Sievert | 310/154 |
| 4,424,463 | 1/1984 | Musil | 310/49 R |
| 4,438,362 | 3/1984 | Brown | 310/152 |
| 4,484,114 | 11/1984 | Ebbs | 318/138 |
| 4,994,702 | 2/1991 | Arita | 310/254 |
| 5,220,228 | 6/1993 | Sibata | 310/254 |
| 5,302,876 | 4/1994 | Iwamatsu et al. | 310/156 |
| 5,319,844 | 6/1994 | Huang et al. | 29/598 |

Primary Examiner—Steven L. Stephan
Assistant Examiner—Tran N. Nguyen
Attorney, Agent, or Firm—Vickers, Daniels & Young

[57] ABSTRACT

A brushless, direct current, permanent magnet motor is disclosed, which comprises a stator and a rotor mounted for rotation about an axis in the stator. The stator has a plurality of stator teeth separated by axial interpolar teeth slots. Two pairs of ferrite ceramic magnets, formed as arc segments of equal circumferential length and axially constant radial thickness, are mounted on the rotor. Leading and trailing margins of each magnet are magnetized with a longitudinally varying magnetization strength or gradient while the central portion of each magnet is uniformly magnetized. This process produces axially alternating areas of low and high magnetization, which simultaneously cross each interpolar teeth slot upon rotor rotation to minimize cogging. An air gap of axially uniform width and the constant magnet thickness provides a constant reluctance path radially through the air gap and margins of the magnets.

23 Claims, 4 Drawing Sheets

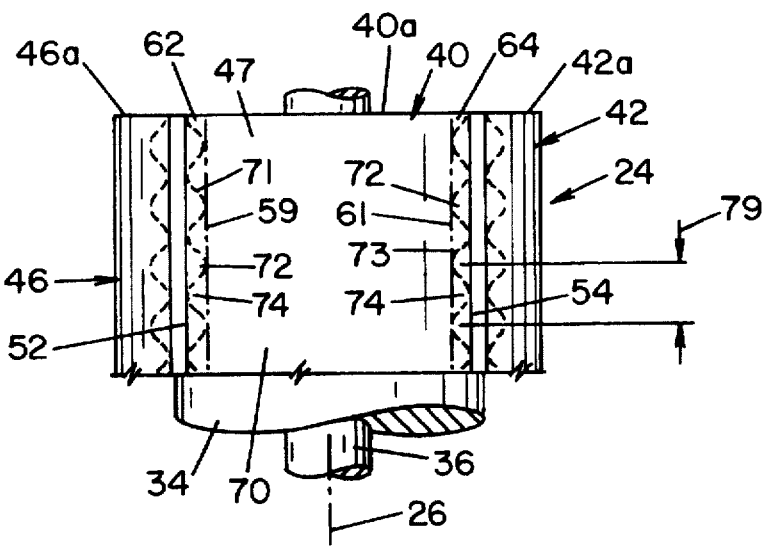
FIG. 2
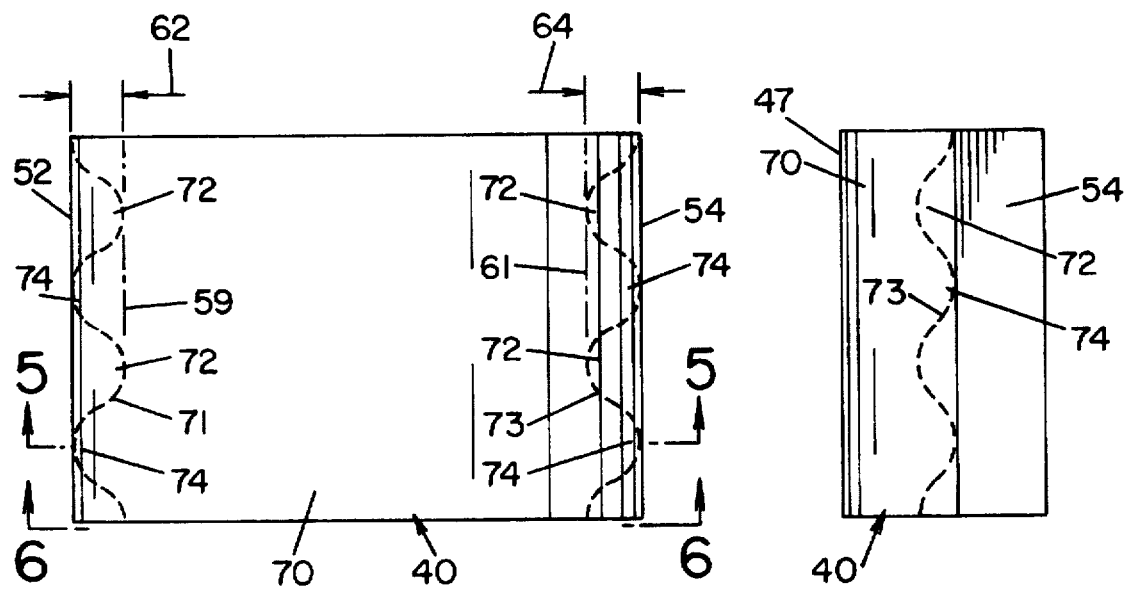
FIG. 3
FIG. 4

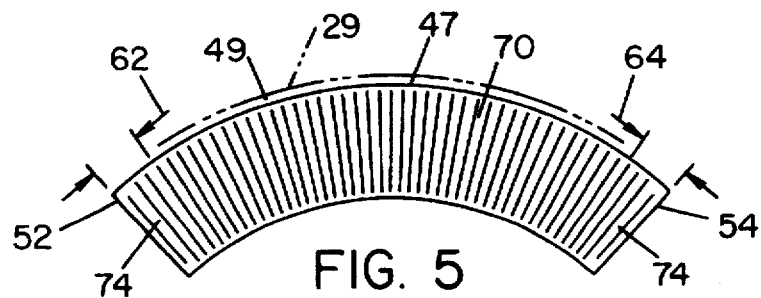
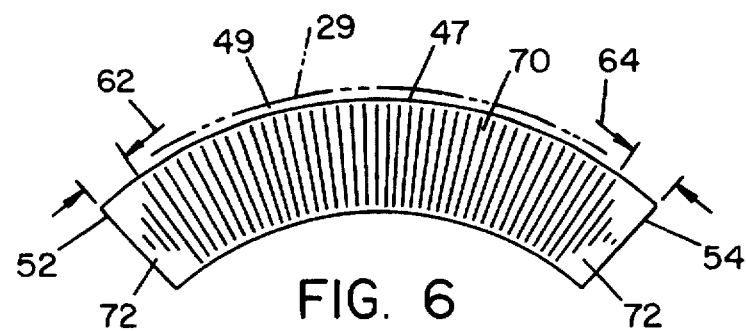
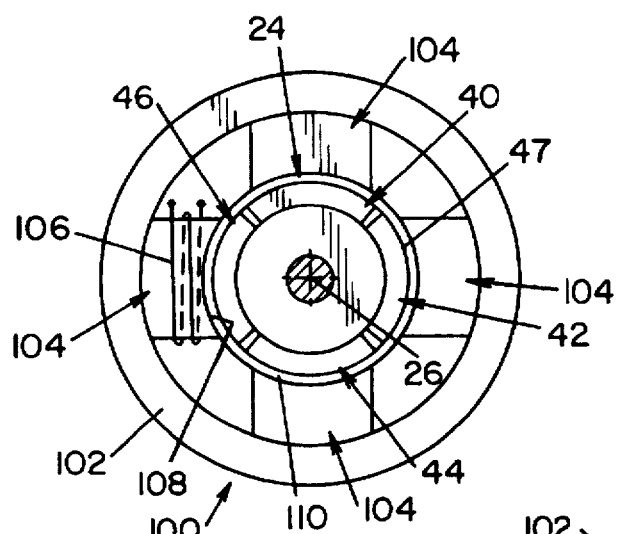
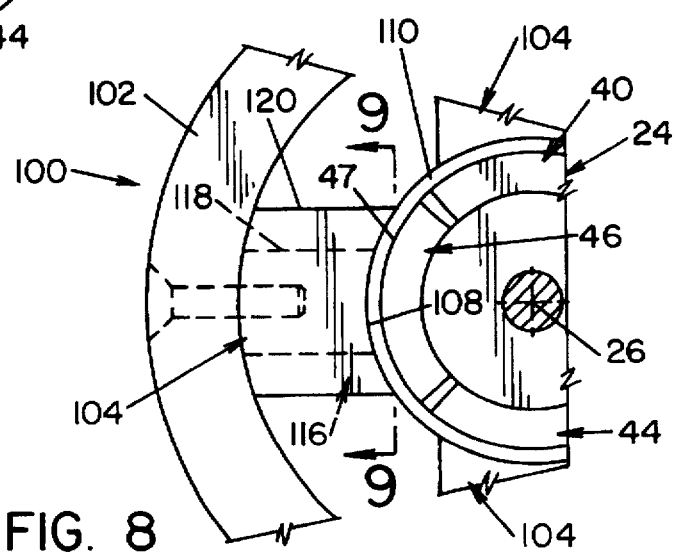

IMPRINTED GEOMETRIC MAGNETIC ANTICOG PERMANENT MAGNET MOTOR

This invention relates generally to permanent magnet rotating machines and more particularly to method and apparatus minimizing "cogging" associated with permanent magnet rotating machines.

The invention is particularly applicable to and will be described with specific reference to an anti-cogging, permanent magnet, brushless, DC motor. However, those skilled in the art will recognize that the invention is not limited to DC brushless motors and can be used in other types of permanent magnet rotating machines including brush-type motors, alternating current motors and generators.

INCORPORATION BY REFERENCE

The following United States patents and publications are incorporated by reference herein so that the Detailed Description of the Invention need not explain in detail what is known in the art as reflected by the material incorporated herein by reference. The material incorporated herein by reference does not form part of the present invention.

| PATENT NO. | INVENTOR | DATE | TITLE |
| --- | --- | --- | --- |
| 4,438,362 | Brown | 03/20/84 | Self-starting, Direct Current Motor with Permanent Magnets of Varied Magnetic Strength |
| 4,424,463 | Musil | 01/03/84 | Apparatus for Minimizing Magnetic Cogging in an Electrical Machine |
| 4,484,114 | Ebbs | 11/20/84 | Self-starting Brushless DC Motor |
| 4,091,300 | Lynch et al | 05/23/78 | Permanent Magnet Electrical Machines |
| 4,216,400 | Lynch et al | 08/05/80 | Permanent Magnet Electrical Machines |
| 4,341,969 | Sievert | 07/27/82 | Direct Current Motor with Improved Pole Piece that Reduces Cogging |
| 3,860,843 | Kawasaki et al | 01/14/75 | Rotating Electric Machine with Reduced Cogging |

PUBLICATIONS

M. G. Say, *Alternating Current Machines*, John Wiley & Sons, New York, 1976, pages 103-107 and 294.

M. G. Say, *Direct Current Machines*, John Wiley & Sons, New York, 1980, by M. G. Say and E. Openshaw Taylor, pages 50-52 and 329.

BACKGROUND OF THE INVENTION

Direct current, brushless permanent magnet motors typically have one or more pairs of permanent magnet poles affixed to a rotor mounted for rotation about an axis within a stator. The stator has a series of poles or teeth angularly spaced around the rotor to oppose the poles of the rotor across an air gap. Field windings are wound around the stator poles or teeth which are angularly separated from one another by axially or longitudinally extending interpolar spaces. As the rotor magnets rotate across the interpolar spaces, the magnetic attraction between the permanent magnet poles and the rotor poles varies. This effect, described in detail in U.S. Pat. No. 4,424,463 to Musil, is known as cogging or pole sensitivity.

One symptom of cogging is that, when the motor stops, the rotor tends to assume a preferred, equilibrium angular relationship with the stator poles, which can cause difficulties in starting the motor. Another symptom of cogging is a variable torque characteristic during steady state operation of the motor. Instead of providing a constant torque throughout each rotation of the motor, cogging causes the torque to vary in a sinusoidal or other periodic manner. This aspect of cogging is particularly disadvantageous in servo control motors and slow-speed continuous-operation motors, in which smooth operation is important. It is also a problem in small motors and motors designed for relatively low-cost applications, because of the difficulty and expense of implementing anticogging measures and the need for high efficiency.

Among the methods commonly employed to alleviate cogging in direct current permanent magnet motors is a technique known as skewing. A conventional brushless permanent magnet motor employs permanent magnets that are generally rectangular and curved about a predetermined radius of curvature into an arc segment. Skewing employs a parallelogram-shaped magnet. Such skewed magnets are, however, more difficult to form than rectangular magnets into an arc segment because the leading and trailing edges of the magnet are not parallel to the axis of curvature. This difficulty presents a virtually insurmountable obstacle in the use of ferrite ceramic magnets. Such material is cast or sintered in the magnet manufacturing process and, therefore, must be ground to obtain close mechanical tolerances. A skewed geometry ceramic magnet is not amenable to grind. Skewing has been accomplished with rare earth metal magnets, such material being more malleable than ferrite ceramic materials. Rare earth metal magnets, however, are much more expensive to use in motors than ferrite ceramic materials. Alternatively to skewing the magnets, the stator teeth can be skewed, for example, as disclosed in U.S. Pat. No. 4,424,463 to Musil. However, skewing the stator reduces the available space for windings and makes winding the stator more difficult, more time consuming and, therefore, more expensive. Another difficulty with skewing is that the skew angle must be adjusted to correspond to the axial length of the motor. Each motor of a different length must be designed anew. The rotors cannot be simply made in greater or shorter lengths to make motors of different powers, as is preferable in the manufacture of small and low-cost motors. Other undesirable effects of skewing are discussed by M. G. Say, *Alternating Current Machines*, fifth edition, page 294.

Another approach to reducing cogging is to vary the dimension of the air gap at the leading and trailing edge of either the stator poles or the magnets. U.S. Pat. No. 3,860,843 to Kawasaki et al. discloses stator poles which are tapered so that the air gap is wider along the leading and trailing edges of the pole than at its center. In U.S. Pat. Nos. 4,091,300 and 4,216,400 to Lynch et al., magnets with flat air gap faces are used in combination with convexly curved armature poles to provide an increased air gap at the leading and trailing edges of the magnets. While serving to smooth the cogging effects in these motors to some extent, the increased air gap tends to decrease the efficiencies of these motors.

U.S. Pat. No. 4,341,969 to Sievert discloses a brush-type direct current motor having two permanent magnet pole pieces in the shape of partial cylinders. Each magnet has a cylindrical inner surface which is notched along its leading and trailing edges so that the air gap is increased along each edge. The assignee of Sievert also manufactures a brushless servo motor, which is essentially the inverse of the Sievert motor. Four ceramic magnet poles are mounted on the rotor.

Such magnets are notched on their leading and trailing edges, as shown in FIGS. 11-14. This arrangement has three drawbacks. First, as with skewing, it is difficult to grind notches in ferrite ceramic magnets because of the brittleness of the material. In addition, during operation of such a motor, the points of magnet material along the leading and trailing edges of the pole pieces tend to concentrate the magnetic flux which would otherwise pass through the notched regions. The resultant increased magnetic flux densities tend to demagnetize the points along the edges of the pole pieces, neutralizing their effect. Finally, this approach becomes very inefficient when implemented in multi-pole machines. As in the Kawasaki and Lynch et al. designs, the increased air gap along the leading and trailing edges decreases efficiency. Ceramic magnets are also of relatively low induction, and therefore require a larger cross-sectional area of the air gap. The available area is reduced by notching. These problems worsen as the number of poles increases and the ratio of notched magnet area to working air gap area increases.

The above-mentioned Musil and Kawasaki patents also disclose using fewer stator teeth or poles than the number of permanent magnet poles, which is made very large. Kawasaki also uses an odd number of stator poles and Musil angularly offsets selected stator poles so that only a fraction of the stator teeth align with magnet poles at any time. These measures overly complicate and greatly increase the cost of such motors.

Various techniques have also been proposed to minimize the effects of cogging upon starting a motor. U.S. Pat. No. 4,484,114 to Ebbs discloses a two-pole brushless DC motor which uses a second pair of poles, with starting windings angularly offset from the primary pair of poles and windings to make motor self starting. Through a timing circuit, the starter windings are energized when the motor is first turned on, initially to move the main poles away from the cogged position, and then de-energized. U.S. Pat. No. 4,438,362 to Brown, commonly assigned with the Ebbs patent, discloses a permanent magnet direct current motor which is made self starting with the use of permanent magnets having varying magnetization. The magnetization is reduced along the leading edge of the permanent magnets so that the rotor position after motor deenergization is angularly offset from a cogged position. While assisting in starting the motor, neither of these measures significantly affects the varying torque characteristics of the motor during steady state operation. Moreover, such measures significantly degrade the efficiencies and torque of the motors, as discussed by M. G. Say, *Direct Current Machines*, 1980, at page 329 with reference to the various small permanent magnet machine structures shown in FIG. 34 and described at pages 50–52.

Accordingly, a need remains for an improved form of anticog permanent magnet motor, and particularly, one that is less susceptible to cogging during both start-up and steady state operation, that operates efficiently, and that can be readily implemented in inexpensive materials, such as ferrite ceramic magnets.

SUMMARY OF THE INVENTION

It is thus a principal object of the invention to improve the cogging characteristics of permanent magnet rotating machines.

This object along with other features of the present invention is achieved in a permanent magnetic motor which includes a housing with a stator having an inner cylindrical surface and a plurality of slotted teeth opening extending radially outward from the inner surface for receiving windings wound between the teeth to define stator poles. A rotor is provided within the housing which carries a plurality of identical, permanent magnets affixed at equal circumferential increments about a longitudinally extending rotable shaft concentric with the inner surface. The magnets extend longitudinally along the shaft a distance about that of the stator's inner surface and have an outer generally cylindrical surface concentric with and spaced radially inward from the inner surface to define a physical annular air gap therebetween which importantly is maintained constant so that a constant reluctance path through the air gap exists radially and longitudinally. Each magnet's outer surface extends from a longitudinally extending leading edge surface to a longitudinally extending trailing edge surface and each magnet further has an imaginary trailing line and an imaginary leading line extending between the leading and trailing edges so that the trailing line is generally adjacent and parallel to the trailing edge to define a trailing edge margin therebetween while the leading line is generally parallel to and adjacent the leading edge to define a leading edge margin of the magnet therebetween. Each magnet is uniformly magnetized to a first magnetic field strength between the leading and trailing edge margins while each magnet is magnetized in a periodic, undulating manner which varies from a first magnetic field strength to a lesser second magnetic field strength along the length of the leading and trailing margins whereby cogging of the motor is minimized.

In accordance with another important aspect of the invention, the anticogging operational aspects of the machine are enhanced by each magnet being magnetized at a uniform magnetic field strength in the leading and trailing edge margins in a circumferential direction while periodically varying in magnetic field strength along the length of the margins. Significantly, each magnet is magnetized in the trailing edge margin to a pattern or imprint which is identical to that pattern or imprint which the magnet is magnetized in the leading edge margin. The magnetic imprint imposed on the leading and trailing edge margins follows a geometric pattern which preferably is sinusoidal in configuration thus maintaining the efficiency of the motor because of a constant reluctance path while simultaneously minimizing cogging.

In accordance with another feature of the invention, the circumferential width of each margin is set at an angular distance equal to that of the angular spacing or pitch between adjacent stator teeth slots while the longitudinal spacing between adjacent undulations is set at a distance sufficient to prevent flux leakage thus avoiding localized demagnetization which could occur under high torque conditions.

In accordance with another aspect of the invention, a method of making a permanent magnet rotating machine having the foregoing structure is provided. The magnet is magnetized in a magnetic field directed radially of the air gap. The magnetic field is shaped so as to provide a first magnetization field over a central portion of the magnet between the edge margins and a second magnetization field, less than the first magnetization field, within the constant volume of magnetizable material within each margin of the magnet. The fields are shaped in accordance with a predetermined longitudinally varying geometric pattern which defines adjoining axial or longitudinally extending regions of different magnetic field intensity in the magnetizable material to produce correspondingly varying magnetization along the margins of the magnet.

It is thus another object of the invention to provide a machine and a method for making same which reduces cogging during both start-up and steady state operation of such machines.

Another object is to reduce cogging as aforementioned while maintaining high torque and efficiency of operation.

A further object of the invention is to reduce cogging without increasing, preferably while reducing, the complexity and cost of manufacturing such machines.

Yet another object is to minimize cogging in multi-pole permanent magnet motors employing large-area ferrite magnets, without increasing the cost and complexity of such motors and without degrading, and preferably improving, their torque and efficiency.

An additional object is to provide a motor which incorporates anticogging measures in such a way that motors of any desired length can be constructed without redesign.

Still yet another object of the invention is to provide a permanent magnet machine and/or method for making same which utilizes inexpensive ferrite ceramic magnet material which does not have to be machined at its edges while providing anti-cogging measures to permit the machine to efficiently operate without undue harmonic variations in the magnetic flux.

Still yet another object of the invention is to provide a permanent magnet machine and/or method for making same which utilizes anti-cogging measures which do not diminish the efficiencies of the machine while the magnetic leading and trailing edge margins pass between the interpolar spaces of adjacent stator slotted teeth.

These and other objects, features, and advantages of the present invention will become apparent to those skilled in the art upon reading and understanding the detailed description of the invention set forth below.

BRIEF DESCRIPTION OF THE DRAWINGS

The invention may take form in certain parts and in an arrangement of certain parts, taken together and in conjunction with the attached drawings which form a part of the invention and wherein:

FIG. 2 is a side view taken along lines 2—2 of a portion of the permanent magnet rotor of FIG. 1;

FIG. 3 is a top plan view of a single arc-segment permanent magnet, as employed in the motor of FIGS. 1 and 2;

FIG. 4 is a side elevational view of the magnet of FIG. 3;

FIGS. 5 and 6 are cross-sectional views of the magnet taken along lines 5—5 and 6—6, respectively, in FIG. 3, shaded to show orientation and relative distributions of magnetization;

FIG. 7 is an axial end view of a magnetizing fixture with a permanent magnet rotor positioned therein for magnetizing in accordance with the invention;

FIG. 8 is an enlarged view of one quadrant of the magnetizing fixture and rotor of FIG. 7;

DETAILED DESCRIPTION OF THE PREFERRED EMBODIMENT

Figure 1:
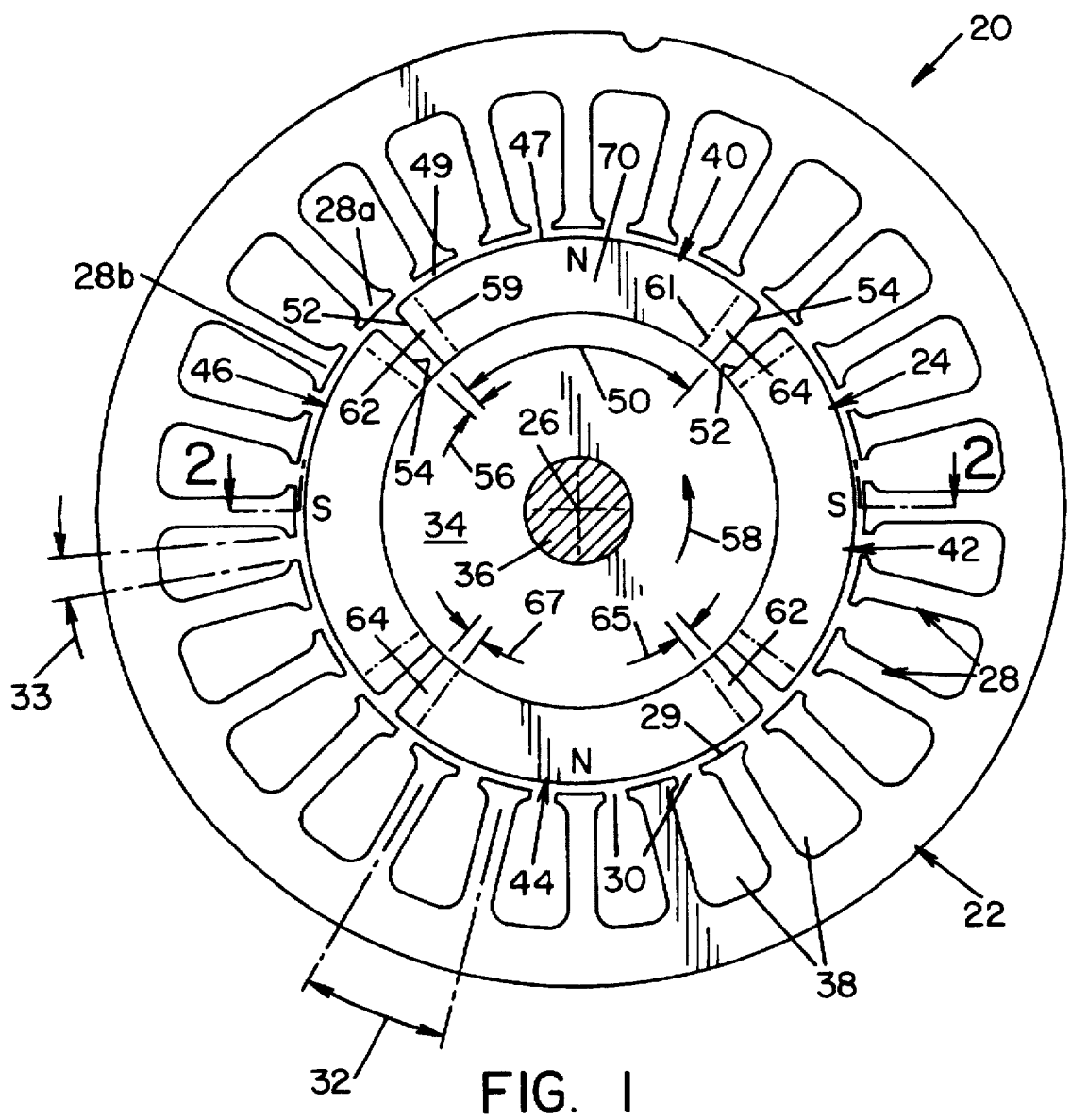
FIG. 1 is a cross-sectional view of a four-pole brushless, direct current, permanent magnet motor in accordance with the invention, the stator windings omitted for clarity.

Referring now to the drawings wherein the showings are for the purpose of illustrating the preferred embodiment of the invention only and not for the purpose of limiting the same, there is shown in FIG. 1 a permanent magnetic motor 20 embodying the invention. Motor 20 includes a housing (not shown) which, in turn, includes an annular stator 22 and a generally cylindrical rotor 24 concentrically positioned within stator 22 for rotation about a central, longitudinally extending axis 26.

Stator 22 includes a plurality (e.g. 24 in the preferred embodiment) of radially extending teeth or salient poles 28 spaced at equal circumferential increments about the inside of the stator. Stator teeth 28 have a T-shaped cross section configuration with the top of the "T" forming an inner cylindrical surface 29 of stator 22. Inner cylindrical surface 29 extends a longitudinal distance about equal or slightly longer than rotor 24. Teeth 28 extend radially outwardly from inner cylindrical surface 29. In-between teeth 28 are slotted teeth openings 30 or interpolar spaces. Teeth 28 and teeth openings 30 are circumferentially spaced about inner cylindrical surface 29 and extend radially outwardly therefrom. As shown in FIG. 1 and as noted, teeth 28 and openings 30 are radially constructed to intersect central axis 26 so that the angular spacing between adjacent teeth 28 (or the angular spacing between adjacent teeth openings 30) defines the stator pole pitch indicated by reference numeral 32 in FIG. 1 of stator teeth or poles 28 (i.e., 15 degrees in the preferred embodiment). Windings (not shown) are conventionally wound into a U-shaped portion 38 of slotted teeth openings 30 between stator teeth 28. At the same time it is to be recognized that teeth slotted opening (or the interpolar space) 30, is defined to exist at inner cylindrical surface 29 which is at the base of stator teeth 28 and thus slotted opening 30 must span an arcuate distance less than stator teeth pitch 32 designated by reference numeral 33 in FIG. 1 (i.e., about 5 degrees in the preferred embodiment). Those skilled in the art will recognize that slotted teeth openings 30 cause a change in the physical air gap and consequently the reluctance path contributing to the cogging phenomena described above.

Rotor 24 includes an annular, soft iron yoke or core 34 concentrically mounted on steel shaft 36 which is appropriately journaled (not shown) so as to rotate about central axis 26. Four (4) ferrite ceramic magnets 40, 42, 44, 46 are mounted on the outer surface of yoke 34. Except for direction of magnetization, which is radial and which alternates polarity between adjacent magnets, the magnets are substantially identical in size, shape, and composition so that the description with respect to any one of the four magnets will apply to all four. As shown, each magnet 40, 42, 44, 46 is an arc segment affixed at equal circumferential increments about yoke 34 and extending longitudinally along yoke 34 a distance about equal to that of inner cylindrical surface 29 of stator 22. Each magnet 40, 42, 44, 46 has an outer, generally cylindrical surface 47 concentric with central axis 26 and spaced radially inward from inner cylindrical surface 29 thus defining a physical, annular air gap 49 therebetween. Importantly, annular air gap 49 is constant.

Outer cylindrical surface 47 of each magnet 40, 42, 44, 46 extends from a leading edge 52 to a trailing edge 54. Leading edge 52 and trailing edge 54 are radial and if extended would intersect central axis 26. Leading edge 52 of one magnet is spaced from trailing edge 54 of an adjacent magnet (i.e., 40–42, 42–44, 44–46, 46–42) an arcuate distance which equals arcuate distance 33 of slotted teeth openings 30 (i.e., 5 degrees in the preferred embodiment). This is shown by reference numeral 56 in FIG. 1. Thus, each magnet 40, 42, 44, 46 spans an arcuate segment designated by reference numeral 50 which in the preferred embodiment is about 85 degrees.

Referring now to FIGS. 1 and 2, and for purposes of definition there is shown in dash form an imaginary leading line 59 which if extended would intersect central axis 26. Imaginary leading line 59, which is radial, is spaced from but adjacent to leading edge 52. Similarly, each magnet has an imaginary trailing line 61 adjacent to but spaced from trailing edge 54. Imaginary trailing line 61 is likewise radial so that if extended, imaginary trailing line 61 would intersect central axis 26. Imaginary lines 59, 61 as shown in FIG. 2 extend longitudinally the length of each magnet 40, 42, 44, 46. The space or volume of each magnet between leading edge 52 and imaginary leading line 59 is defined as a leading edge margin 62. Similarly, the space or volume between trailing edge 54 and imaginary trailing line 61 is defined as a trailing edge margin 64. Importantly, the angular distance between imaginary leading line 59 and leading edge 52 or the arc spanned by leading edge margin 62 is shown as reference numeral 65 in FIG. 1 and equals the arcuate distance 33 between slotted teeth openings 30. Similarly, the angular distance between imaginary trailing line 61 and trailing edge 54 or the arcuate distance spanned by trailing edge margin 64 is shown by reference numeral 67 in FIG. 1 to be equal to arcuate distance 33 of slotted teeth openings 30 (about 5 degrees in the preferred embodiment). That is, trailing edge and leading edge margins 64, 62 are identical for each magnet and, as will be explained shortly, their magnetization field patterns are also identical so that all magnets 40, 42, 44, 46 have identical margins 62, 64 which contain identical magnetization field patterns imprinted thereon. Finally, the central region or area of each magnet is designated by reference numeral 70 and extends between margin 62, 64. The thickness of each magnet is constant throughout its length.

Referring now to FIGS. 2, 3, 4, 5 and 6, each magnet 40, 42, 44, 46 is magnetized to have a substantially uniform magnetic field strength of a first level throughout central region 70. In leading edge and trailing edge margins 62, 64, magnets 40, 42, 44, 46 are magnetized to have a magnetic field strength which varies longitudinally in a periodic undulating manner along the length of magnets 40, 42, 44, 46. Preferably, the magnetization of margins 62, 64 varies from the first magnetic field level of central region 70 to a lower second magnetic field level to establish a magnetic field strength gradient in margins 62, 64. Still further, the periodic undulating magnetic field in leading edge margin 62 is identical to that produced in trailing edge margin 64. Within margins 62, 64, magnetic field strength is uniform in a circumferential direction and varies only in the longitudinal direction in accordance with a predetermined, desired geometric pattern. In the preferred embodiment and as shown in FIGS. 2–4, the periodic undulation or magnetic field gradient is sinusoidal, the longitudinal spacing in the margins 62, 64 of the periodic undulation being about one-half inch.

The longitudinally extending magnetization gradient is shown in FIGS. 2, 3, and 4 by dash line 71 for leading edge margin 62 and by dash line 73 for trailing edge margin 64. Each magnetization gradient 71, 73 may, in turn, be defined as having a longitudinally extending region of increasing magnetization gradient 74 followed by a longitudinally extending region of decreasing magnetization gradient indicated by reference numeral 72, it being understood that the highest magnetization field strength in increasing magnetization gradient 74 is equal to the first magnetic field strength while the lowest magnetic field strength in decreasing magnetization gradient region 72 is equal to the second magnetic field strength. Further, while dash line 71, 73 indicate a longitudinal magnetic gradient in FIGS. 2–4, the length of the radial lines drawn through magnet sections in FIGS. 5 and 6 indicates the magnetic field strength to distinguish between the highest and lowest magnetization levels.

As best shown in FIG. 2, not only are longitudinal magnetization gradients 71, 73 axially or longitudinally aligned with one another within each magnet, but they are also longitudinally or axially aligned with the magnetization gradients of the other magnets 40, 42, 44, 46. Further, the length-wise spacing of the magnetization gradient, for example, from the lowest magnetization field in deceasing magnetization gradient 72 to the lowest magnetization field in the next adjacent decreasing magnetization gradient 72 as shown by reference numeral 79 is equal to the arcuate distance or pitch 32 between adjacent stator teeth 28 at inner cylindrical surface 29. This geometry assures that margins 62, 64 of both high and low magnetization simultaneously cross each slotted tooth opening 30. Further, unlike the prior art solutions, the length of stator 22 and rotor 24 do not affect design of the motor. The magnetization gradient regions in margins 62, 64 is simply extended for whatever length rotor 24 and stator 22 are sized at. For this reason, FIG. 2 simply shows the rotor construction starting from one axial end face 40a, 42a, 46a of magnets 40, 42,46 respectively. The opposite axial end face is not shown, it being understood that the magnetization pattern as described is simply extended to the motor end.

METHOD OF MAGNETIZATION

Referring to FIG. 7, rotor 24 is assembled with non-magnetized magnets and then magnetized in a magnetizing fixture 100. The fixture comprises a thick-walled steel tubular member 102 in which are mounted four (4) inwardly extending pole extensions 104. Windings 106 are wound in equal number onto each of the pole extensions. Each of the pole extensions has an inner face 108 which is concavely cylindrical about or concentric with axis 26. The radius of faces 108 is somewhat greater than the radius of outer cylindrical surfaces 47 of magnets 40, 42, 44, 46. A protective nonmagnetic (e.g., TEFLON) sleeve 110 is fitted around rotor 24 to center it in fixture 100 and protect rotor magnets 40, 42, 44, 46 from damage when the rotor is inserted and withdrawn from the fixture.

Figure 9:
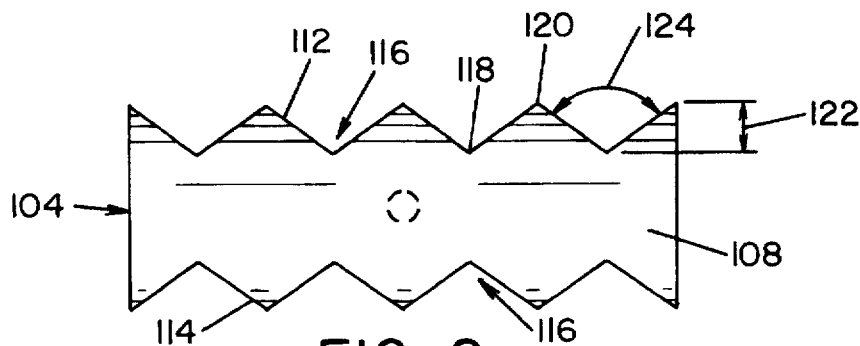
FIG. 9 is a plan view, taken along lines 9—9 in FIG. 8 showing the structure of the magnetizing fixture pole extensions.

Each pole extension 104 has an axial length, as illustrated in FIG. 9 which sized to match the length of the particular rotor to be magnetized. The circumferential sides 112, 114 of the pole extensions are formed with parallel V-shaped channels 116 defining, at surface 108, a sawtooth or zigzag pattern or other desired geometric pattern. The channels have an apex 118 and a point 120 circumferentially spaced apart at surface 108 to define a channel depth 122 equal to pitch 32 of stator teeth 28. The imprinted geometric magnetization gradient pattern chosen is such that channel walls are oriented at an angle 124 that is sufficiently large, e.g., 105 degrees or a distance ½" or more, to limit magnetizing flux leakage to the immediate locale of apex 118. The circumferential width of the pole extensions between the points 120 on opposite sides of the extension is approximately equal to the corresponding dimension of the magnets.

Figure 10:
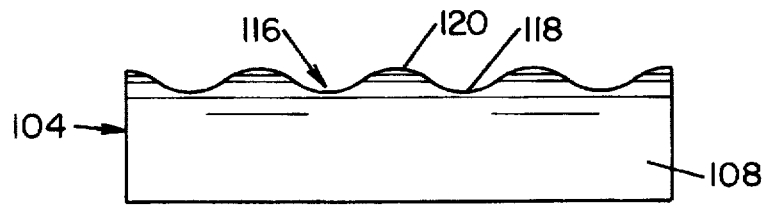
FIG. 10 is a view similar to FIG. 9 but illustrating a different embodiment of the geometric magnetizing pattern to be imprinted into the edge margins of the magnet.
Figure 11:
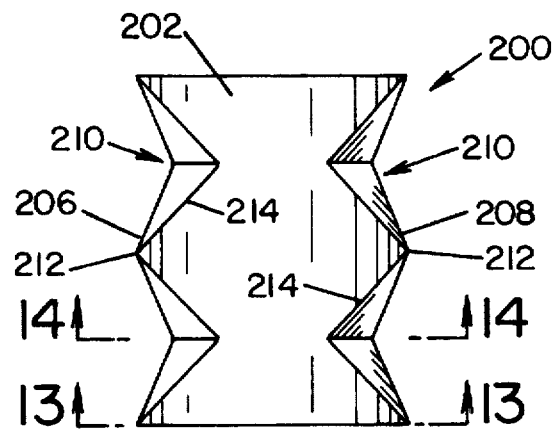
FIG. 11 is a plan view of a prior art anticogging-type permanent magnet for use in a four-pole, brushless permanent magnet motor.
Figure 12:
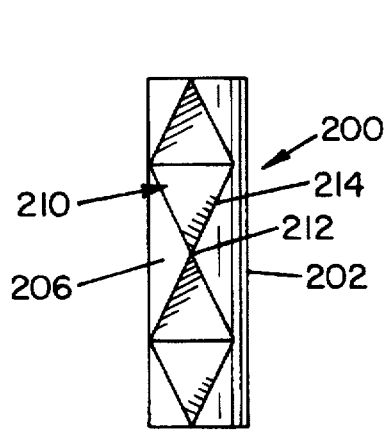
FIG. 12 is a side elevation view of the permanent magnet of FIG. 11.
Figure 13:
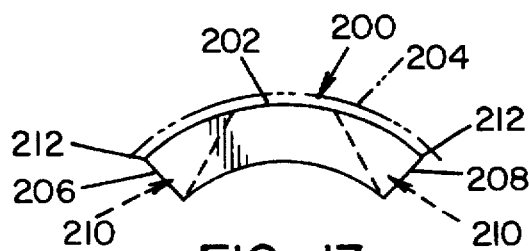
FIGS. 13 and 14 are cross-sectional views taken along lines 13—13 and 14—14, respectively, in FIG. 11.
Figure 14:
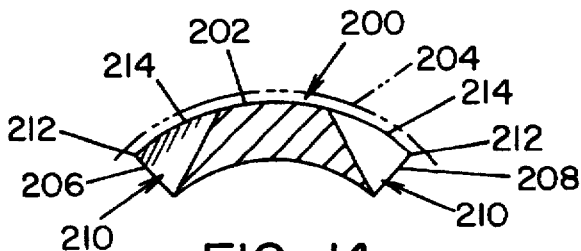

The geometric pattern of FIG. 9 which imprints the desired magnetization gradients into edge margins 62, 64 can be changed depending on the configuration of stator teeth 28. FIG. 10 illustrates a sinusoidal imprint using the same reference numerals of FIG. 9 to indicate like components. Other magnetization gradient patterns will suggest themselves to those skilled in the art.

Fixture 100 is operated to magnetize the magnets on rotor 24. In one example, the magnets are ferrite ceramic, e.g., Allen-Bradley M10 or Hitachi YBM-2B ceramic. Such material has a required magnetizing force $H_S$ of 10,000 Oersteds. The magnetizing force applied during magnetization should not exceed the required magnetizing force by more than 20%, and is preferably in the range of 10%–15% above the required magnetizing force, e.g., 11,000–11,500 Oersteds for M10 ceramic. During magnetization, the pole extensions channel the magnetization flux so as to magnetize the magnets substantially in accordance with the geometric pattern defined at surface 108 by the channels in the sides of the pole extensions. If the above-described magnetizing force range is exceeded, fringing effects will tend to obliterate the geometric pattern of varying magnetization along the margins of the magnets. To assist in imprinting the desired magnetization gradient into edge regions 62, 64 diamagnetic wedges (not shown) could be inserted into spaces 116.

OPERATION

In general, the operating of motor 20 is like that of other brushless, direct current, permanent magnet motors. The varying magnetization (i.e., magnetization gradient) along leading and trailing margins 62, 64 of the magnets, however, minimizes the cogging torque as the leading and trailing edges pass over teeth openings 30 (interpolar spaces) of stator teeth 28. Referring to FIG. 1, as the rotor rotates counterclockwise, as indicated by arrow 58, the leading edge of magnet 40 crosses slotted tooth opening 30. If leading edge margin 62 was uniformly magnetized, it would continue to be attracted by stator tooth 28a and would be repelled by stator tooth 28b, producing a cogging torque. By providing an axially or longitudinally varying magnetization gradient in edge margins 62, 64 to a reduction of cogging torque. At the same time edge margins 62, 64 continue, because of the magnetization gradient, to contribute magnetic energy to the windings avoiding the inefficiencies of certain prior art approaches such as typified by Brown U.S. Pat. No. 4,438,362.

The reduction of cogging torque is obtained without significantly degrading motor torque and efficiency. Indeed, motors constructed in accordance with the preferred embodiment of the invention demonstrate a higher torque, a higher efficiency and a lower static friction, which is principally due to cogging torque, than comparable brushless permanent magnet motors constructed utilizing the magnets shown in FIGS. 11–14.

Following is motor data for a one horsepower motor designed with Allen-Bradley M10 ceramic magnets in accordance with the invention for continuous operation:

| Abbr. | Motor Data for BLR #4060 | Units | |
|---|---|---|---|
| Ke | Voltage Constant; ±10% | V/KRPM | 70 |
| Kt | Torque Constant; ±10% | OZ IN/AMP | 95 |
| Ics | Max. Rated Current At Stall | AMPS | 8 |
| Ipk | Max. Peak Current | AMPS | 121 |

-continued

| Abbr. | Motor Data for BLR #4060 | Units | |
|---|---|---|---|
| Tcs | Max. Cont. Torque At Stall | OZ IN (47.5 LB/IN) | 760 |
| Tp | Peak Torque (without non-linearities in Kt) | OZ IN | 11,495 |
| R | Phase to Phase Resistance; ±10% | OHMS | 1.50 |
| L | Phase to Phase Inductance | mH | 7 |
| tm | Mechanical Time Constant | ms | 1.50 |
| te | Electrical Time Constant | ms | 5 |
| Jm | Inertia | OZ IN SEC$^2$ | 0.067 |
| Rth | Thermal Resistance | °C./WATT | 0.45 |
| Kd | Damping Coefficient | OZ IN/KRPM | 3 |
| Tf | Static Friction | OZ IN | 6 |
| W | Motor Weight | LBS | 26 |

Comparing the prior art magnets of FIGS. 11–14 with those of FIGS. 4–6, a number of differences can be observed that explain the different torque, efficiency and cogging characteristics. Prior art magnet 200 is an arc segment having an air gap face 202 concavely curved to provide a predetermined air gap between the magnet and the stator poles, as indicated by dashed line 204 in FIGS. 13 and 14. V-shaped notches 210 are spaced at intervals along both the leading and trailing edges 206, 208 of magnet 200. Between the notches, the material of magnet 200 forms points or apexes 212 at the air gap face 202. In the operative motor, the working air gap between the magnet and the stator teeth is limited to the area air gap face 202 between the edges 214 of the notches. The notches provide an increased air gap along much of the leading and trailing edges of magnet 200 which is substantially greater than the air gap at air gap face 200, providing a high reluctance path to radially directed lines of flux. The lines of flux passing from a stator tooth into the margin of magnet 200 are thus concentrated axially toward points 212. Under high torque conditions, localized demagnetization can occur.

In contrast, magnets 40, according to the invention, provide a uniform air gap over the entire outer cylindrical surface 47 which extends the full distance from the leading edge 52 to the trailing edge 54 of the magnet. The thickness and intrinsic permeability of the magnetic material along both edge is also axially constant. Consequently, radial flux lines from the stator across the physical air gap 49 and though the margins of magnet 40 traverse a path of axially constant-reluctance. For two magnets of the same overall dimensions, the effective air gap surface of magnet 40 is substantially greater than that of magnet 200. Additionally, because the areas of high and low magnetization are axially aligned along the leading and trailing edges, the leading and trailing edges of adjacent, oppositely magnetized magnets can be spaced very close together with minimal flux leakage between the magnets. This feature enables the circumferential dimension of the arc segments to be maximized.

Having illustrated and described the principles of my invention with reference to one preferred embodiment, it should be apparent to persons skilled in the art that the invention may be modified in arrangement and detail without departing from such principles. For example, the rotor could be constructed to surround the stator as well known in the art. The number of magnets could be varied to any reasonable even number. It is intended to cover all such modifications and alterations insofar as they come within the scope of the present invention.

Having thus defined the invention it is claimed:

1. A permanent magnetic motor comprising:
   a housing including a stator having an inner cylindrical surface from which a plurality of teeth between slotted openings extend radially outward therefrom for receiving windings wound between said teeth to define stator poles;

a rotor carrying a plurality of identical permanent magnets of alternating polarity affixed at equal circumferential increments about a longitudinally-extending rotatable shaft concentric with said inner surface, said magnets extending longitudinally along said shaft a distance about that of said inner surface and having an outer, generally cylindrical surface concentric with and spaced radially inward from said inner surface to define a constant physical, annular air gap therebetween; each magnet's outer surface circumferentially extending between a longitudinally-extending leading edge surface to a longitudinally-extending trailing edge surface;

each magnet further having an imaginary trailing line and an imaginary leading line, each line positioned between said leading and trailing edges with said trailing line generally adjacent but spaced from said trailing edge to define a trailing edge margin of said magnet therebetween and said leading line generally adjacent but spaced from said leading edge to define a leading edge margin of said magnet therebetween; each magnet being uniformly magnetized to a first magnetic field strength between said leading and trailing edge margins while being magnetized to a periodic, undulating magnetic field strength which varies from said first magnetic field strength to a lesser second magnetic field strength along the length of said leading and trailing margins whereby cogging of said magnet is minimized.

2. The motor of claim 1 wherein said magnet being magnetized at a uniform magnetic field strength in said leading and trailing edge margins in a circumferential direction while periodically varying in magnetic field strength only along the length of said margins.

3. The motor of claim 2 wherein each magnet being magnetized in said trailing edge margin identical to that of said leading edge margin.

4. The motor of claim 3 wherein said periodic variation of said magnetic field strength in said margins is a sinusoidal variation.

5. The motor of claim 4 wherein the longitudinal spacing in said margin of said periodic undulation is at least about one-half inch.

6. The motor of claim 1 wherein said trailing edge of any given magnet is spaced from said leading edge of an adjacent edge an angular increment equal to the angular spacing between adjacent teeth in said stator.

7. The motor of claim 1 wherein the angular spacing between said imaginary trailing line and said trailing edge and the angular spacing between said imaginary leading edge line and said leading edge is equal to the angular spacing of said slots in said stator.

8. The motor of claim 1 wherein said magnets are formed of ferrite ceramic material of constant thickness.

9. The motor of claim 5 wherein said trailing edge of any given magnet is spaced from said leading edge of an adjacent edge at an angular increment equal to the angular spacing between adjacent teeth in said stator.

10. The motor of claim 9 wherein the angular spacing between said imaginary trailing line and said trailing edge and the angular spacing between said imaginary leading edge line and said leading edge is equal to the angular space between adjacent slots in said stator of said slots in said stator.

11. The motor of claim 10 wherein said magnets are formed of ferrite ceramic material of constant thickness.

12. A permanent magnet machine comprising:

a stator having a plurality of stator poles spaced angularly apart about teeth slotted openings extending parallel to an axis of rotation of the motor, the poles defining an air gap surface curved in accordance with a first predetermined radius;

a rotor mounted for rotation about the axis within the stator;

a pair of oppositely magnetized magnets mounted on the rotor and angularly spaced so as to align with the stator poles on opposite sides of one of the slotted openings;

each magnet having an outer surface circumferentially extending between a longitudinally-extending leading and trailing edge and curved in accordance with a second predetermined radius complementary to the air gap surfaces of the stator poles and spaced radially inward therefrom to define an annular air gap of uniform width;

each magnet being integrally formed of a magnetizable ceramic material with a constant radial thickness of magnetizable material within a marginal region longitudinally-extending along each edge of the magnet;

the material in each marginal region being variably magnetized to define longitudinally-extending alternating areas of high and low magnetization so that a portion of each of said margins adjacent said edges simultaneously passes over each slotted opening during operation of the motor.

13. A permanent magnet motor according to claim 12 in which the material is uniformly magnetized throughout a central region between the marginal regions of each magnet and the magnetization in the marginal region is variable in accordance with an undulating pattern longitudinally-extending along each margin.

14. A permanent magnet motor according to claim 13 in which magnets are circumferentially sized so that adjacent leading and trailing edges are spaced apart a distance approximately equal to the width of said teeth slotted openings.

15. A permanent magnet motor according to claim 14 in which the areas of low magnetization along the trailing edge of one magnet are longitudinally aligned with the areas of low magnetization along the leading edge of an adjacent magnet.

16. A permanent magnet motor according to claim 15 including two of said pairs of magnets, centered at 90° angular intervals about the rotor, each magnet forming an arc segment of about 85°.

17. A permanent magnetic motor comprising:

a housing including a stator having a plurality of teeth between slotted openings which extend radially from said stator for receiving windings wound between said teeth to define stator poles;

a rotor carrying a plurality of identical permanent magnets of alternating polarity affixed at equal circumferential increments about a longitudinally extending rotatable shaft, said magnets extending longitudinally along said shaft and spaced radially from said stator poles to define an annular air gap of uniform width between said magnets and said stator poles; each magnet's outer surface circumferentially extending between a longitudinally extending leading edge surface to a longitudinally extending trailing edge surface;

each magnet further having a longitudinally extending trailing edge margin of said magnet adjacent said trailing edge surface and a longitudinally extending leading edge margin adjacent said leading edge surface; each magnet being uniformly magnetized to a first magnetic field strength between said leading and trailing edge margins while being magnetized to a periodic, undulating magnetic field strength which varies from said first magnetic field strength to a lesser second magnetic field strength along the longitudinally extending leading and trailing edge margins whereby cogging of said magnet is minimized.

18. The motor of claim 17, wherein said plurality of identical magnets are magnetized at a uniform magnetic field strength in said leading and trailing edge margins in a circumferential direction while periodically varying in magnetic field strength only along the longitudinal length of said margins.

19. The motor of claim 18, wherein said periodic variation of said magnetic field strength in said margins is a sinusoidal variation.

20. The motor of claim 19, wherein the longitudinal spacing in said margin of said periodic undulation is at least about one-half inch.

21. The motor of claim 17, said plurality of magnets including two pairs of magnets, centered at 90° angular intervals about the rotor, each magnet forming an arc segment of about 85°.

22. The motor of claim 21, wherein each said trailing edge margin and said leading edge margin form an arc segment of about 5°.

23. The motor of claim 17, wherein each said trailing edge margin and said leading edge margin form an arc segment about equal to the angular spacing of said slotted openings in said stator.

* * * * *